United States Patent

Wu et al.

Patent Number: 5,364,572
Date of Patent: Nov. 15, 1994

[54] PROCESS FOR MAKING HIGH-STRENGTH SYNTHETIC AGGREGATES

[75] Inventors: Muh-Cheng M. Wu, Pittsburgh; George E. Wasson, Eighty Four, both of Pa.

[73] Assignee: Consolidation Coal Company, Pittsburgh, Pa.

[21] Appl. No.: 10,241

[22] Filed: Jan. 28, 1993

[51] Int. Cl.$^5$ .............................................. B29C 67/02
[52] U.S. Cl. ................................. 264/40.1; 264/117; 106/405; 106/705
[58] Field of Search ............... 264/117, 40.1; 106/705, 106/405; 23/313 R, 313 P

[56] References Cited

U.S. PATENT DOCUMENTS

| | | | |
|---|---|---|---|
| 4,377,414 | 3/1983 | Buschmann et al. | 106/85 |
| 4,490,178 | 12/1984 | Loggers et al. | 106/118 |
| 4,880,582 | 11/1989 | Spanjer et al. | 264/82 |
| 5,002,611 | 3/1991 | Rademaker | 106/705 |
| 5,033,953 | 7/1991 | Holley | 425/140 |
| 5,137,753 | 8/1992 | Bland et al. | 427/180 |
| 5,173,232 | 12/1992 | Holley | 264/113 |

Primary Examiner—Allan R. Kuhns
Attorney, Agent, or Firm—Alan N. McCartney

[57] ABSTRACT

A process for making high-strength aggregates including hydrating calcium oxide containing coal combustion ash for a sufficient period of time to convert a high percentage of the calcium oxide to calcium hydroxide prior to forming the aggregates and curing the aggregates in high humidity. The moisture of the hydrated material is monitored to vary the hydration moisture to the desired set point. Further, the process involves producing high-strength aggregates from calcium hydroxide containing FGD ashes such as generated from duct sorbent injection and spray dryer processes.

4 Claims, 2 Drawing Sheets

PROCESS FOR MAKING HIGH-STRENGTH SYNTHETIC AGGREGATES

BACKGROUND OF THE INVENTION

1. Field of the Invention

This invention relates to a process for producing high-strength synthetic aggregates from calcium oxide (CaO) containing flue gas desulfurization (FGD) ashes, such as those generated from a fluidized-bed combustion (FBC) unit and the Limestone Injection Multistage Burner (LIMB) process; including a process for producing high-strength synthetic aggregates from calcium hydroxide ($Ca(OH)_2$) containing FGD ashes, such as those generated from duct sorbent injection and spray dryer processes.

2. Summary of Prior Art

There are several processes in the prior art for making pellets suitable as synthetic aggregates. These processes, such as shown in U.S. Pat. No. 4,377,414, utilize solid fly ash containing materials obtained from a lime based dry scrubbing flue gas desulfurization operation. In the U.S. Pat. No. 4,377,414, after the critical amount of water is added, the product is compacted under confined pressure at a critical compaction ratio of from about 2 to 3 so that the interstitial spaces between the fly ash particles are sufficient to accommodate the volumetric changes within the product without deleterious expansion during curing. In the present invention strong aggregates are produced on a rotary pelletization disc without the use of confined pressure.

A process is described in U.S. Pat. No. 4,490,178 in which granules are formed by mixing calcium oxide, fly ash, and water and curing said granules at temperatures between 30° C. and 100° C. Hydration of the calcium oxide to calcium hydroxide takes place during the granulation and curing steps. To control the maximum temperature of the granules during curing, heat absorbing particles are added with the granules. U.S. Pat. No. 4,880,582 also describes a curing system in which the pellets are cured in the presence of particulate fly ash. In the present invention, the hydration reaction occurs before the pelletization and curing steps.

U.S. Pat. No. 4,997,357 describes equipment to treat power station residues containing calcium oxide. The equipment includes mixers and rotary drums.

An apparatus for controlling the amount of water sprayed onto a tilted rotating cylindrical pelletization disc is described in U.S. Pat. No. 5,003,953. A moisture sensor detects the moisture in the pellets in the rotary disc. A signal from this sensor controls the amount of water sprayed onto the pelletization disc by means of a programmable controller. In the present invention, a sensor measures the amount on water contained in the wetted ash solids going to the rotary disc. Using this signal, the amount of water going to the mixer, before the rotary disc pelletizer, is controlled.

SUMMARY OF THE INVENTION

High-strength synthetic aggregates can be produced from CaO containing coal combustion ashes, such as those generated from a fluidized-bed combustion (FBC) unit and the Limestone Injection Multistage Burner (LIMB) process, and from the $Ca(OH)_2$ containing coal combustion ashes, such as those generated from duct sorbent injection and spray dryer processes.

With the CaO containing ash, this is done by first hydrating the ash in a hydrator with sufficient amount of added water so that over 80% of the CaO is hydrated to $Ca(OH)_2$ and, simultaneously, the resultant hydrated material has a high enough moisture content to achieve high density but still has a low enough moisture content to be agglomerated in a disc. The wetted ash, after being hydrated, is agglomerated to produce pelletized products with a desirable grain size distribution by adding a small amount of water on the rotary disc pelletizer. The pelletized products are then cured at an elevated temperature and high humidity for pellet strength development.

With the $Ca(OH)_2$ containing ash, this is done by adding a sufficient amount of water to the ash to achieve high density but still keep the ash at a low enough moisture content that it can be agglomerated in a rotary disc. The wetted ash is agglomerated to produce pelletized products with a desirable grain size distribution by adding a small amount of water on the rotary disc pelletizer. The pelletized products are then cured at an elevated temperature and high humidity for pellet strength development.

DESCRIPTION OF THE PREFERRED EMBODIMENT

Figure 1:
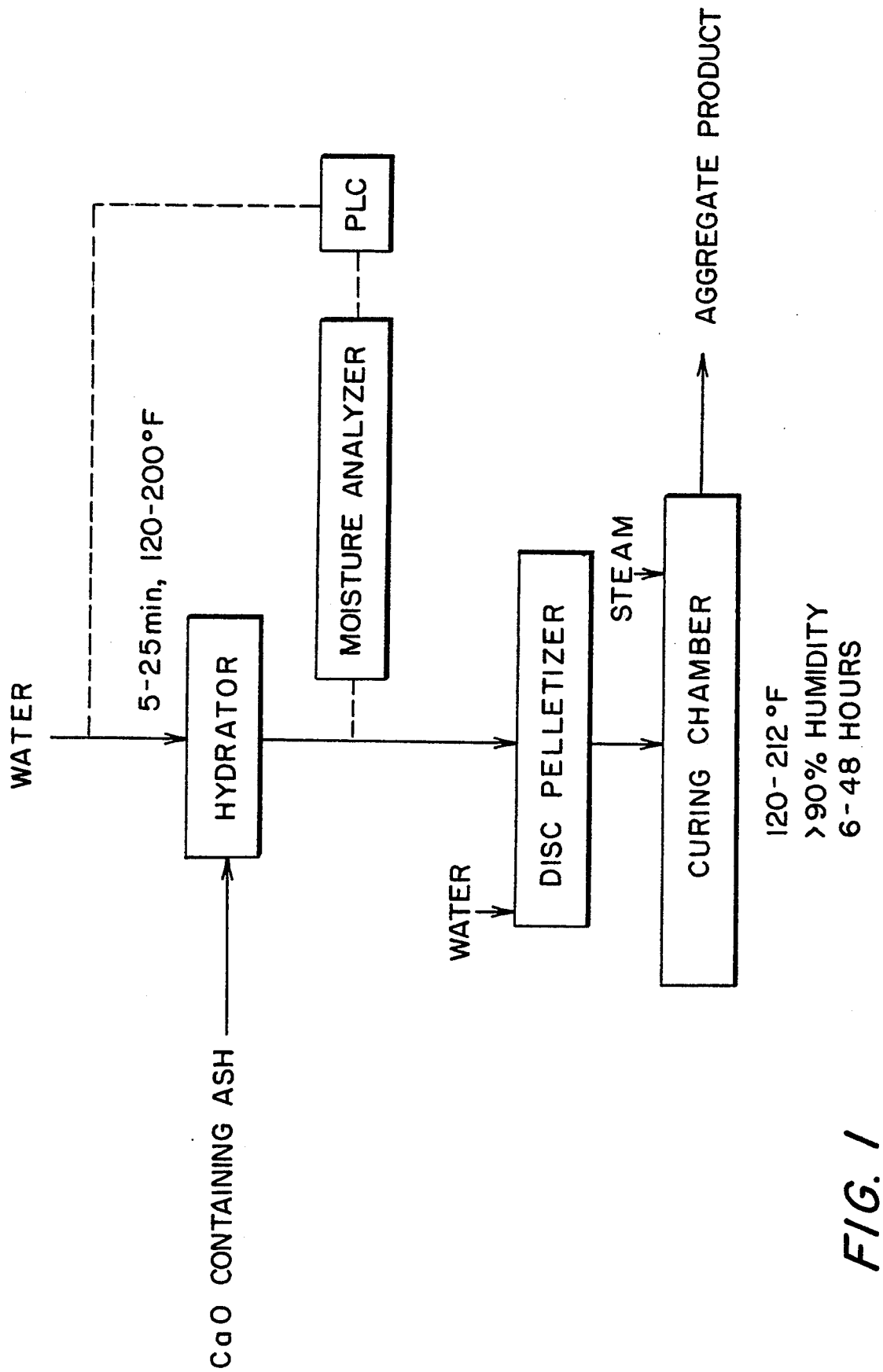
FIG. 1 illustrates the process flow chart for forming aggregate from CaO containing ash; and, FIG. 2 illustrates the process flow chart for forming synthetic aggregates from the $Ca(OH)_2$ containing ash.

Attention is directed to FIG. 1 which illustrates the manufacture of synthetic aggregates from the CaO containing coal combustion ash. The CaO containing ash and water are mixed in a hydrator for hydration. An on-line moisture analyzer measures the ash moisture as the hydrated ash passes from the hydrator to the disc pelletizer and controls the amount of water added to the hydrator to achieve the desired moisture content in the hydrated ash. The hydrated waste then is agglomerated with an additional amount of water in a disc pelletizer for enlargement of particle size. The pelletized products from the disc pelletizer are cured in the curing chamber under high humidity at elevated temperature with addition of steam. Attention is also directed to FIG. 2 which illustrates the manufacture of synthetic aggregates from the $Ca(OH)_2$ containing coal combustion ash. The $Ca(OH)_2$ containing ash and water are mixed in a mixer for densification. An on-line moisture analyzer measures the ash moisture as the wetted ash passes from the mixer to the disc pelletizer and controls the amount of water added to the mixer to achieve the desired moisture content in the wetted ash. The wetted ash is then agglomerated in the disc pelletizer and the pelletized products are cured in the curing chamber with addition of steam, as those illustrated in FIG. 1.

Manufacture of Synthetic Aggregates from the CaO Containing Ash

In the manufacture of synthetic aggregates from the CaO containing ash (FIG. 1), the hydration reaction is carried out to near completion by addition of water to the ash in a hydrator. The hydration must be nearly complete because of the volume expansion that CaO undergoes when it is hydrated to $Ca(OH)_2$ (molar volume of CaO and $Ca(OH)_2$ are 16.8 and 33.1 $cm^3$, respectively). If the expansion occurs during or after the pelletization step, weak pellets will be produced. Also, the hydrated ash should have a moisture content approaching the moisture content of the pelletized products, so that only a small amount of additional water is required for agglomeration of the hydrated ash on a rotary disc pelletizer. For example, the moisture content of the feed to the disc should be one to two weight percent less than the moisture content of the pelletized products. This helps produce the hydrated ash to be fed to the disc with the optimum density. This, in turn, promotes maximum pellet strength development during curing. If a large amount of water is required for agglomeration of the hydrated ash, weak pellets with low density will be produced after curing.

The hydration reaction takes place in a hydrator at a temperature between 120° F. and 200° F. with a residence time of the solids in the hydrator between 5 and 25 minutes, depending on the ash type. The hydrator should have relatively high shear rate to enable rapid mixing of the ash and water.

Water addition to the hydrator is controlled to maintain the moisture in the hydrated ash at some given level between 10 and 20 weight percent (based on total weight), depending on the ash type. The exact moisture content desired is that the moisture level which gives the hydrated ash a high bulk density while still being dry enough to enable agglomeration on a rotary disc pelletizer. As shown in FIG. 1, the water addition to the hydrator can be controlled by continuously analyzing the hydrated ash moisture with an on-line analyzer and by varying the amount of water added to the hydrator to achieve the desired hydrator product moisture set point.

The pellets should be cured at a temperatures between 120° F. and 212° F. at a humidity high enough, preferably greater than 90%, to keep the pellets from drying. The time for curing is between 6 and 48 hours. The higher the curing temperature is, the shorter the curing time is required.

Manufacture of Synthetic Aggregates from the $Ca(OH)_2$ Containing Ash

In the manufacture of synthetic aggregates from the $Ca(OH)_2$ containing ash (FIG. 2), a sufficient amount of water is added to the ash in the mixer to increase the ash density (i.e. densification). The wetted ash should have a moisture content approaching the moisture content of the pelletized products, so that only a small amount of additional water is required for agglomeration of the wetted ash on a rotary disc pelletizer. For example, the moisture content of the feed to the disc should be one to four weight percent less than the moisture content of the pelletized products. This helps produce a wetted ash to be fed to the disc that contains the optimum density. This, in turn, promotes maximum pellet strength after curing. If a large amount of water is required for agglomeration of the wetted ash, weak pellets with low density will be produced after curing.

The densification takes place in a mixer at a temperature between 60° F. and 120 ° F. with a residence time of the solids in the mixing step between 1 and 10 minutes, depending on the ash type. The mixer should have relatively high shear rate to enable rapid mixing of the ash and water.

Figure 2:
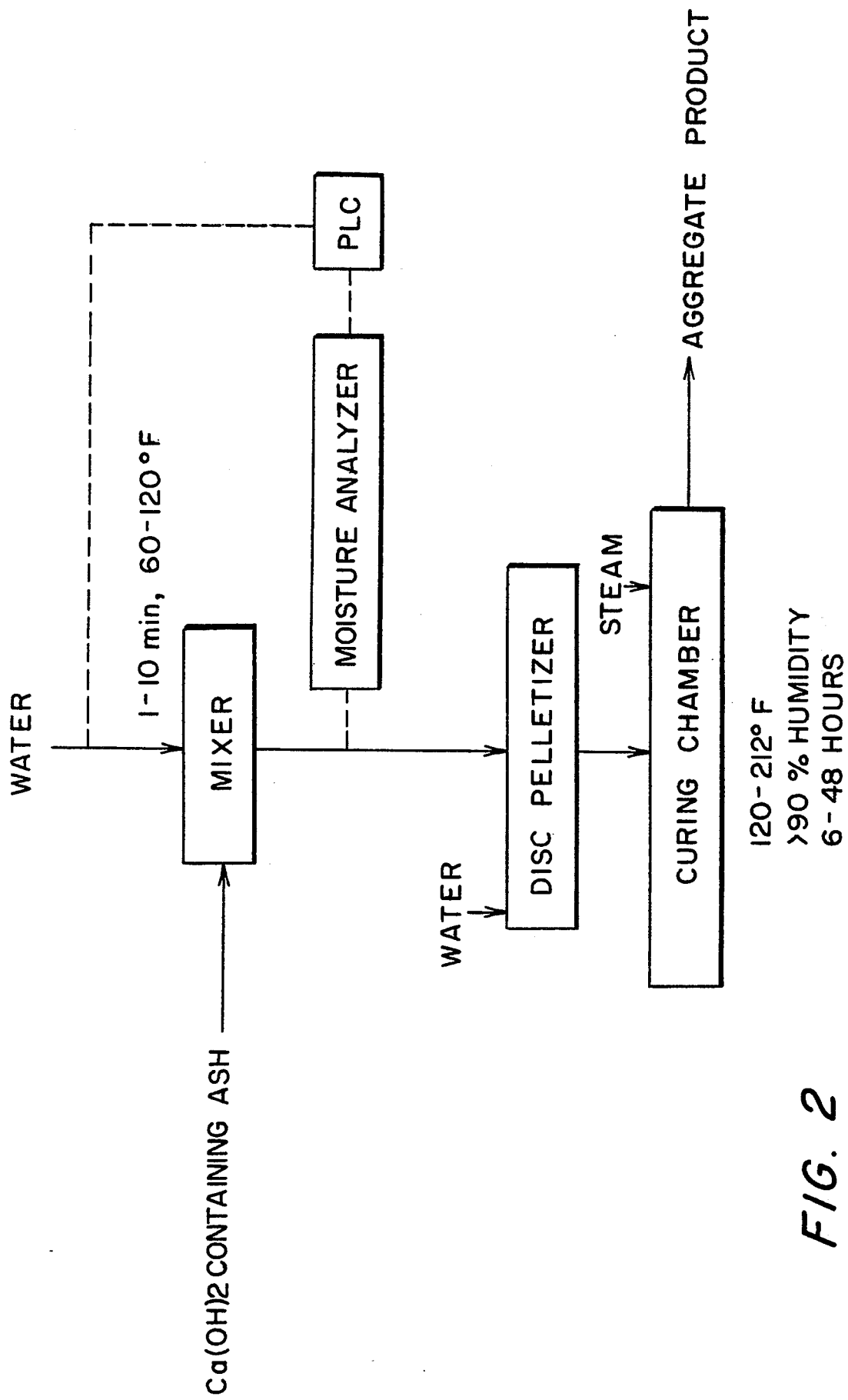

Water addition to the mixer is controlled to maintain the moisture in the wetted ash at some given level between 20 to 30 weight percent (based on total weight), depending on the ash type. The exact moisture content required is the moisture level which gives the wetted ash a high bulk density and is still dry enough to enable agglomeration on a rotary disc pelletizer. As shown in FIG. 2, the water addition to the hydrator can be controlled by continuously analyzing the wetted ash moisture with an on-line analyzer and by varying the amount of water added to the mixer to achieve the desired hydrator product moisture set point.

The curing conditions for manufacture of synthetic aggregates from $Ca(OH)_2$ containing ash are the same as those for manufacture of synthetic aggregates from CaO containing ash.

EXAMPLE 1

High-strength pellets were produced by hydrating a fluidized-bed combustion (FBC) ash by the addition of 37.5 weight percent water in a hydrator. The hydration time was 25 minutes at a temperature of approximately 180° F. More than 80% of the CaO was hydrated to $Ca(OH)_2$. The hydrated ash contained 16.2% of moisture (based on total weight) and had a tapped bulk density of 92.4 lb/ft$^3$. The hydrated ash was agglomerated on a rotary disc pelletizer by addition of 2.7% of water (based on hydrated ash). The pelletized products were then cured in a curing vessel for strength development. After 24 hours curing under high humidity at 100°, 120° and 180° F., the pellet compressive strengths were 51, 116 and 292 lb, respectively. After 48 hours curing, the pellet compressive strengths were 99, 196 and 364 lb, respectively.

For comparison, much weaker pellets were produced when the same ash was hydrated with 33.5% of added water in the same hydrator with a hydration time of 10 minutes at a temperature of approximately 180° F. The hydrated ash contained 13.8% of moisture (based on total weight) and had a tapped bulk density of 66.1 lb/ft$^3$. Only 60% of the CaO in the ash was hydrated to $Ca(OH)_2$. The hydrated ash was agglomerated on the same rotary disc pelletizer in a similar manner by addition of 8.4% of water (based on hydrated ash). The pellet compressive strengths after 48 hours curing under high humidity at 100° and 120° F. were 18 and 44 lb, respectively.

EXAMPLE 2

High-strength pellets were prepared from a fluidized-bed combustion (FBC) ash blended with fly ash (10% based on total weight). The amount of water added in hydrator was 37%. The hydration time was 15 minutes at a temperature of approximately 180° F. More than 80% of the CaO was hydrated to $Ca(OH)_2$. The hydrated ash contained 17.1% of moisture and had a tapped bulk density of 110.8 lb/ft$^3$. The hydrated ash was agglomerated on a rotary disc pelletizer by addition of 0.7% water (based on hydrated ash). The pelletized products were then cured in a curing vessel for strength development. After 24 hr curing under 90% to 100% relative humidity at a temperature of approximately 180° F., the pellets had an average compressive strength of 199 lb, LA abrasion index of 29.1% and soundness index of 9.1% The pellets also had suitable unit weight and grain size distribution for use as coarse aggregates in road construction.

For comparison, weaker pellets were produced when the same ash was hydrated with 35% of added water in the same hydrator with the same hydration time and temperature. The hydrated ash contained 11.6% of moisture (based on total weight) and had tapped bulk density of 88.6 lb/ft$_3$. Over 80% of the CaO in the ash was hydrated to Ca(OH)$_2$. The hydrated ash was agglomerated on the same rotary disc pelletizer in the same manner by addition of 8.0% of water (based on hydrated ash). After curing under the same conditions, the pellet compressive strength was 50 lb, which is considerably weaker than the pellets prepared with 37% of added water in hydration.

EXAMPLE 3

High-strength pellets were produced from a spray dryer ash by the addition of 32% weight percent water (based on dry ash) to densify the dry ash in a high intensity mixer. The mix time was five minutes at ambient temperature. The wetted ash contained 24.5% of moisture (based on total weight) and had a tapped bulk density of 79.9 lb/ft$^3$. The wetted ash was agglomerated on a rotary disc pelletizer by addition of 1.6% of water (based on wetted ash). The pelletized products were then cured in a curing vessel for strength development. After 24 hr curing under 90% to 100% relative humidity at temperature of about 180° F., the pellets had an average compressive strength of 71 lb and a LA abrasion index of 38.9%. The pellets also had suitable unit weight and grain size distribution for use as coarse lightweight aggregates in concrete masonry units.

For comparison, weaker pellets were produced when the same ash was densified with 27% of added water in the same mixer with the same mix time and temperature. The wetted ash contained 21.3% of moisture (based on total weight) and had a tapped bulk density of 61.7 lb/ft$^3$. The wetted ash was agglomerated on the same rotary disc pelletizer by addition of 9.0% of water. The pelletized products were then cured in a curing vessel for strength development. After curing under the same conditions, the pellet compressive strength was 40 lb, which was considerably weaker than the pellets prepared with 32% of added water in densification.

EXAMPLE 4

High-strength pellets were produced from a duct sorbent injection ash by the addition of 25% weight percent water (based on dry ash) to densify the ash in a high intensity mixer. The mix time was five minutes at ambient temperature. The wetted ash contained 22.1% of moisture (based on total weight) and had a tapped bulk density of 73.4 lb/ft$^3$. The wetted ash was agglomerated on a rotary disc pelletizer by addition of about 4% water (based on wetted ash). The pelletized products were then cured in a curing vessel for strength development. After 24 hr curing under 90% to 100% relative humidity at a temperature of about 180° F., the pellets had an average compressive strength of 70 lb and a LA abrasion index of 34.2%. The pellets also had suitable unit weight and grain size distribution for use as coarse lightweight aggregates in concrete masonry units.

For comparison, weaker pellets were produced when the same ash was densified with 22% added water in the same mixer with the same mix time and temperature. The wetted ash contained 20.8% of moisture (based on total weight) and had a tapped bulk density of 63.8 lb/ft$^3$. The wetted ash was agglomerated on the same rotary disc pelletizer by addition of 6.9% of water. The pelletized products were then cured in a curing vessel for strength development. After curing under the same conditions, the pellet compressive strength was 39 lb, which was considerably weaker than the pellets prepared with 25% of added water in densification.

From the above examples, high-strength pellets can be made from CaO containing coal combustion ashes, such as those generated from a fuidized-bed combustion unit (FBC) and the Limestone Injection Multistage Burner (LIMB) process and from the Ca(OH)$_2$ containing coal combustion ash, such as those generated from duct sorbent injection and spray dryer processes. The pellet strength met the rigorous ASTM LA abrasion requirements for use in road construction. In addition to high strength, the pellets have several other useful properties for use as synthetic aggregates in road and structural construction. For example, the synthetic aggregates from FBC ash have suitable unit weight, grain size distribution, LA abrasion and soundness indices for use as coarse aggregates in road base, asphalt concrete and Portland cement concrete in road construction. The synthetic aggregates from LIMB, duct sorbent injection and spray dryer ashes have suitable unit weight, grain size distribution for use as coarse lightweight aggregates in concrete masonry units.

We claim:

1. Method of producing high-strength aggregates from calcium oxide (CaO) containing coal combustion ash comprising:
   a.) hydrating the ash in a hydrator for 5 to 25 minutes at a temperature between 120° F. and 200° F. so that at least 80% of the calcium oxide is hydrated to calcium hydroxide,
   b.) adding enough water to the ash in the hydrator to densify the ash such that only a small amount of additional water is added during pelletization with a rotary disc with the hydrated ash from the hydrator having a moisture content between 10 and 20 weight percent,
   c.) pelletizing the hydrated ash from the hydrator with a rotary pelletizing disc.; and,
   d.) curing the pelletized products at a temperature between 120° and 212° F. in a curing chamber at a high humidity, greater than 90%, for 6 to 48 hours to develop high pellet strength.

2. The method of claim 1 including monitoring the moisture content of the ash in the hydrator and controlling the moisture level of the hydrated ash passing to the pelletizer by automatic control of water addition to the hydrator.

3. Method of producing high strength synthetic aggregates from calcium hydroxide (Ca(OH)$_2$) containing coal combustion ash which has a relatively low concentration of calcium oxide (CaO) comprising:
   a.) adding enough water to the ash in a mixer for 1 to 10 minutes at a temperature between 60° F. to 120° F. to densify the ash such that only a small amount of additional water is added to the wetted ash during pelletization with a rotary disc; the wetted ash from the mixer having a moisture content between 20 to 30 weight percent,
   b.) pelletizing the wetted ash from the mixer with the rotary pelletizing disc.; and,
   c.) curing the pelletized products at a temperature between 120° F. and 212° F. in a curing chamber at a high humidity, greater than 90%, for 6 to 48 hours to develop pellet strength.

4. The method of claim 3 including monitoring the moisture content of the ash from the mixer and controlling the moisture level of the wetted ash going to the disc pelletizer by automatic control of the water addition to the mixer.

* * * * *